Patented Nov. 13, 1923.

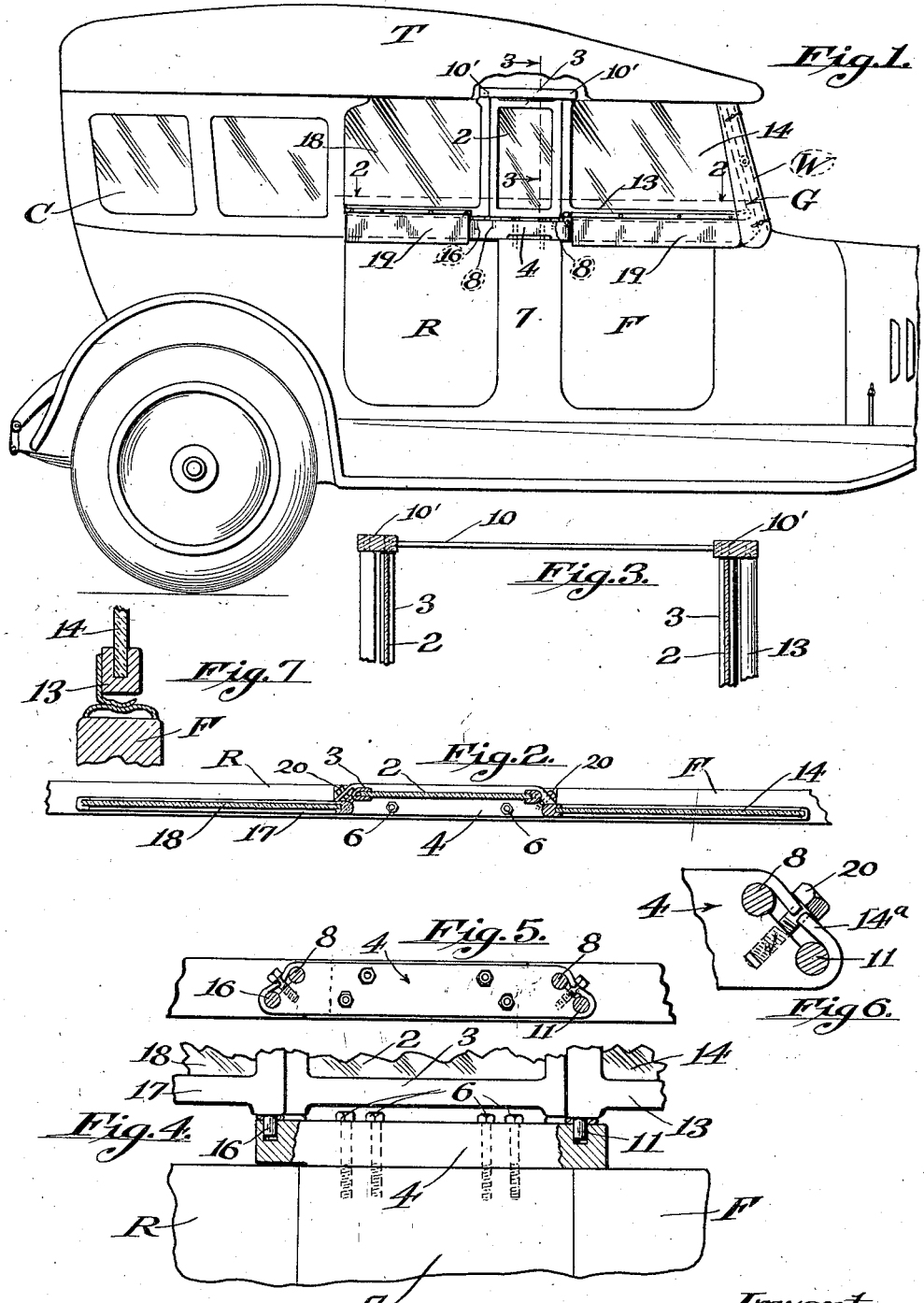

1,474,316

UNITED STATES PATENT OFFICE.

LEONARD H. CLARK, OF LOS ANGELES, CALIFORNIA.

DEMOUNTABLE SIDE INCLOSURE.

Application filed December 22, 1922. Serial No. 608,476.

*To all whom it may concern:*

Be it known that I, LEONARD H. CLARK, a citizen of the United States, residing at Los Angeles, in the county of Los Angeles and State of California, have invented new and useful Improvements in Demountable Side Inclosures, of which the following is a specification.

This invention relates to automobile side inclosures.

As is well known, the open touring body type of automobiles is generally popular and very extensively bought and used, but it is desirable to provide means for providing a substantially rigid but adjustable form of side closure for enabling the use of such open type of touring cars in and during inclement weather and in windy weather.

The need of a substantial but adjustable and detachable side closure is well known and several attempts have been made to provide attractive and substantially rigid side closures, but the better and more practical forms of such closures have been of such high cost as to preclude their general adoption.

Therefore, it is one of the objects of my invention to provide a side closure for open touring cars which is at once of a substantial and practicable form of construction and not prohibitively expensive. Another object is to provide a substantial and rigid side closure including glass windows certain of which are relatively adjustable as to the body so as to provide not only for ingress and egress, but also to provide for ready opening and closing to secure ventilation and at the same time provide a structure, the parts of which may be readily set in closed and effective weather-tight position.

Other objects and advantages will be made manifest in the following specification of an embodiment of the invention illustrated in the accompanying drawings, wherein Figure 1 is a side elevation of a type of touring car to which the side inclosures have been applied.

Fig. 2 is a horizontal section on line 2—2 of Fig. 1.

Fig. 3 is a vertical section on line 3—3 of Fig. 1.

Fig. 4 is a side elevation and partial section showing in detail the construction of mounting elements.

Fig. 5 is a horizontal section and plan of parts shown in Fig. 4.

Fig. 6 is a plan showing in detail a form of pivot shaft fastener for securing the windows in adjusted position.

Fig. 7 is a detail of a door fastening means.

It has heretofore been proposed to provide special tops for touring types of automobiles, and such tops have embodied sliding windows and guides and frames therefor permanently attached to the body, all at considerable expense and impairing the desired characteristic of touring cars, especially in summer use by reason of the permanent installation.

In the present invention means are used for effectually closing the sides of the vehicle to make the same sufficiently weatherproof and comfortable during inclement and windy weather, and at the same time provide for ample ventilation and, when necessary, total dismounting of the side inclosures.

Such inclosures, as I have constructed and practically used, include an intermediate, nonadjustable window 2 having a suitable and preferably rigid frame 3 which is secured to a base or sill 4 which is shown as fastened by screws 6 to the top of the body buttress 7 between the front door F and the rear door R on one side of the vehicle. The intermediate panel window 2 extends preferably up under the lower edge of the usual top T of the vehicle.

The frame 3 may be mounted on fixed uprights 8 spaced along the inner side of the sill 4 and carrying a top cross bar 10 provided for rigidity of the intermediate panels. The ends of the top cross bar are secured in blocks 10' which are mounted on the upper ends of the pivot shafts.

At the forward and outer corner of the sill 4 is arranged a vertical pivot or shaft 11, and mounted on this is a substantially L-shaped window frame 13 having a glass window panel 14. The front window frame and panel extends forwardly over the front door F and is of such length that when closed the glass panel 14 swings comparatively close to the windshield support W; Fig. 1, and to cover the slight opening between the front windshield and the window 14, a flexible wind guard G of any suitable material is fastened to the windshield or to the supporting post W and is adapted to be lapped outwardly around over the front end of the front window 14. The window 14 is thus so mounted on its vertical axis 11 that it can be swung forwardly to closing position or swing open to extend rearwardly along the top of the sill 4 and thus provide not only for ingress and exit, but also provide for ventilation when desired.

At the rear and outer corner of the sill 4 is an upright pivot or shaft 16, and on this is mounted an L-shaped rear window frame 17 in which is mounted a rear glass window panel 18. This rear window is thus adapted to be swung on its vertical axis to a position rearwardly over the rear door R, and, when desired, may be swung outwardly to provide ingress and egress and to provide for ventilation when desired.

If desired the lower elements of the window frames 13 and 17 may be provided with flexible aprons or flaps 19 to form a suitable weather-tight cover between the lower edges of the frames and the top of the doors.

It is to be understood that the front and rear swinging windows 14 and 18 are adapted to be mounted upon each side of the vehicle to be swung over the respective front and rear doors, and any suitable form of rear closure, as flexible windowed curtains C, may be utilized for the body of the car back of the rear doors.

Any suitable means may be employed for temporarily locking the windows in one adjusted position or another, and such means is clearly shown in Fig. 6 in which an end of the sill 4 is shown as slotted to form seats for the pivot shafts 8 and 11. The outer wall of the slotted portion is bifurcated and a set screw 20 is threaded into the sill with its head adapted to be jammed down against the bifurcated wall 4ª so that these will be sprung inwardly and firmly grip the pivot shafts 8 and 11.

In Fig. 7 there is shown a simple latch in the bottom of one of the swinging glass doors or panels as 14, which is adapted to lock temporarily on the top of the contiguous body door F so as to hold the swinging panel in closed position.

Further embodiments, modifications and changes may be resorted to within the spirit of the invention as here claimed.

What is claimed is:

1. A side inclosure for an automobile comprising, in combination, a central fixed window panel, a base piece adapted to be secured upon the intermediate buttress between the front and rear doors in one side of an automobile and on which said panel is mounted, and a forwardly extending glass window and a rearwardly extending glass window each mounted on said base and adapted to be swung to open and closed positions as to the intermediate panel.

2. A side inclosure for an automobile comprising, in combination, a perforated base member, a central fixed window panel having bottom pins adapted to be secured in said member and upon the intermediate buttress between the front and rear doors in one side of an automobile, a forwardly extending glass window and a rearwardly extending glass window each having pivot pins in said member and adapted to be swung to open and closed positions as to the intermediate panel, and a top transverse bracing means for holding the panel and windows in firm upright position.

3. A side inclosure for an automobile comprising a sill adapted to be solidly secured to the intermediate buttress of the vehicle body between the front and rear doors and having split pin holes, a fixed window panel mounted on said sill and having pins clamped in said holes, a transverse connection for securing panels at opposite sides of the vehicle to secure rigidity of construction, and a forwardly extending and a rearwardly extending window and having pins in said holes and pivoted to swing on vertical axes on said sill, and clamp screws for clamping the pins in the base.

4. A device attachable to the buttress of an automobile between the front and rear side doors, said device including an elongated bar forming a sill to engage the top edge of the buttress, said sill having at each end pin receiving sockets, an intermediate window structure having in its lower portion pins to enter holes in the sill, and end windows having pins pivoted in the ends of said sill, the said end windows being movable into substantial alignment along the sill and with the intermediate window structure.

5. A device attachable to the buttress of an automobile between the front and rear side doors, said device including an elongated bar forming a sill to engage the top edge of the buttress, means for securing the sill detachably on the buttress, an intermediate window structure fixedly mounted upon and along the sill and having upright side stiles, and end windows pivotally mounted upon the ends of the sill and having stile portions parallel and contiguous to the stiles of the intermediate window structure and with which the end windows are adapted to be moved into substantial alignment to form a side closure over the front and rear doors and intermediate buttress.

6. A device attachable to the buttress of an automobile between the front and rear side doors, said device including an elongated bar forming a sill to engage the top edge of the buttress, means for securing the sill detachably on the buttress, an intermediate window structure fixedly mounted upon and along the sill and having upright side stiles, and end window pivotally mounted upon the ends of the sill and having stile portions parallel and contiguous to the stiles of the intermediate window structure and with which the end windows are adapted to be moved into substantial alignment to form a side closure over the front and rear doors and intermediate buttress; the sill, the intermediate window structure and the end wings forming an organized attachment adapted to be readily applied to a side buttress of a vehicle.

In testimony whereof I have signed my name to this specification.

LEONARD H. CLARK.